(12) United States Patent
Suzuki

(10) Patent No.: US 12,372,941 B2
(45) Date of Patent: Jul. 29, 2025

(54) NUMERICAL CONTROL DEVICE AND NUMERICAL CONTROL METHOD FOR CONTROLLING MOVEMENT OF PROCESSING TOOL THAT APPLIES INTERNAL SURFACE PROCESSING TO RECESSED PART FORMED IN ADVANCE IN WORKPIECE

(71) Applicant: Fanuc Corporation, Yamanashi (JP)

(72) Inventor: Yoshiyuki Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 402 days.

(21) Appl. No.: 17/923,651

(22) PCT Filed: May 6, 2021

(86) PCT No.: PCT/JP2021/017417
§ 371 (c)(1),
(2) Date: Nov. 7, 2022

(87) PCT Pub. No.: WO2021/225148
PCT Pub. Date: Nov. 11, 2021

(65) Prior Publication Data
US 2023/0176540 A1 Jun. 8, 2023

(30) Foreign Application Priority Data

May 8, 2020 (JP) ................................. 2020-082749

(51) Int. Cl.
*G05B 19/402* (2006.01)
*B23Q 15/12* (2006.01)
(52) U.S. Cl.
CPC ........... *G05B 19/402* (2013.01); *B23Q 15/12* (2013.01); *G05B 2219/35519* (2013.01)

(58) Field of Classification Search
CPC .... G05B 19/182; G05B 15/02; G05B 19/401; G05B 19/4097; G05B 19/4103;
(Continued)

(56) References Cited

U.S. PATENT DOCUMENTS 5,493,502 A * 2/1996 Niwa ....................... G06N 7/04
700/188
2006/0291969 A1* 12/2006 Koch ............... G05B 19/40937
409/132

(Continued)

FOREIGN PATENT DOCUMENTS

CN         105378570       3/2016
CN         105629884       6/2016
(Continued)

OTHER PUBLICATIONS

Office Action (The First Office Action) issued Jan. 7, 2025, by the State Intellectual Property Office of People's Republic of China in corresponding Chinese Patent Application No. 202180033518.3 and an English machine translation of the Office Action. (23 pages).

(Continued)

*Primary Examiner* — Darrin D Dunn
(74) *Attorney, Agent, or Firm* — Buchanan Ingersoll & Rooney PC

(57) ABSTRACT

A numerical control device includes a main control unit, a processing program reading unit, and a tool moving path setting unit that sets moving paths of a processing tool between a plurality of recessed parts. The tool moving path setting unit includes: a tool retreat position setting unit that sets a retreat position to be assumed by the processing tool upon completion of internal surface processing; a cutting edge stop angle setting unit that sets a stop angle of a cutting edge, on the basis of a moving direction toward a next recessed part; and a tool retreat path setting unit that sets a retreat path of the processing tool. The stop angle is set in (Continued)

such a manner that a pointing direction of the cutting edge does not have a moving vector component oriented in a same direction as the moving direction.

12 Claims, 9 Drawing Sheets

(58) Field of Classification Search
CPC .. G05B 19/4155; G05B 19/19; G05B 19/402; G05B 19/404; G05B 19/4065; G05B 19/40937; G05B 2219/36342; G05B 2219/45129; G05B 23/0235; G05B 2219/36201; G05B 19/18; G05B 19/4061; G05B 19/4063; G05B 19/4068; G05B 19/41; G05B 19/416; G05B 19/418
See application file for complete search history.

(56) References Cited

U.S. PATENT DOCUMENTS

| | | | |
|---|---|---|---|
| 2014/0121822 A1* | 5/2014 | Suzuki | G05B 19/182 700/190 |
| 2014/0379115 A1* | 12/2014 | Koyanaka | G05B 19/4166 700/159 |
| 2016/0089760 A1 | 3/2016 | Asano et al. | |
| 2016/0147213 A1 | 5/2016 | Murakami | |
| 2016/0259317 A1* | 9/2016 | Peters | G05B 19/402 |
| 2017/0010599 A1* | 1/2017 | Masumiya | B23C 3/12 |
| 2017/0269576 A1* | 9/2017 | Oonishi | G05B 19/416 |
| 2018/0059636 A1* | 3/2018 | Fukumoto | G05B 19/19 |
| 2018/0079043 A1* | 3/2018 | Inoue | G05B 19/29 |
| 2018/0173189 A1* | 6/2018 | Makino | G05B 19/4067 |
| 2019/0064763 A1* | 2/2019 | Aizawa | G05B 19/401 |
| 2019/0163161 A1 | 5/2019 | Sonoda et al. | |
| 2019/0391565 A1* | 12/2019 | Saitou | G05B 19/4155 |
| 2020/0026256 A1* | 1/2020 | Kurohara | G05B 19/404 |
| 2020/0133237 A1* | 4/2020 | Tango | G05B 19/4155 |
| 2020/0147700 A1* | 5/2020 | Oota | G05B 19/182 |
| 2020/0159190 A1* | 5/2020 | Oota | G05B 19/416 |

FOREIGN PATENT DOCUMENTS

| | | |
|---|---|---|
| CN | 109839897 | 6/2019 |
| JP | 08174320 A | 7/1996 |
| JP | 2017204072 A | 11/2017 |
| JP | 2018034254 A | 3/2018 |
| JP | 2018051738 A | 4/2018 |
| KR | 20060075317 | 7/2006 |
| WO | 2016157456 A1 | 10/2016 |

OTHER PUBLICATIONS

International Search Report and Written Opinion for International Application No. PCT/JP2021/017417, dated Jul. 20, 2021, 5 pages.

* cited by examiner

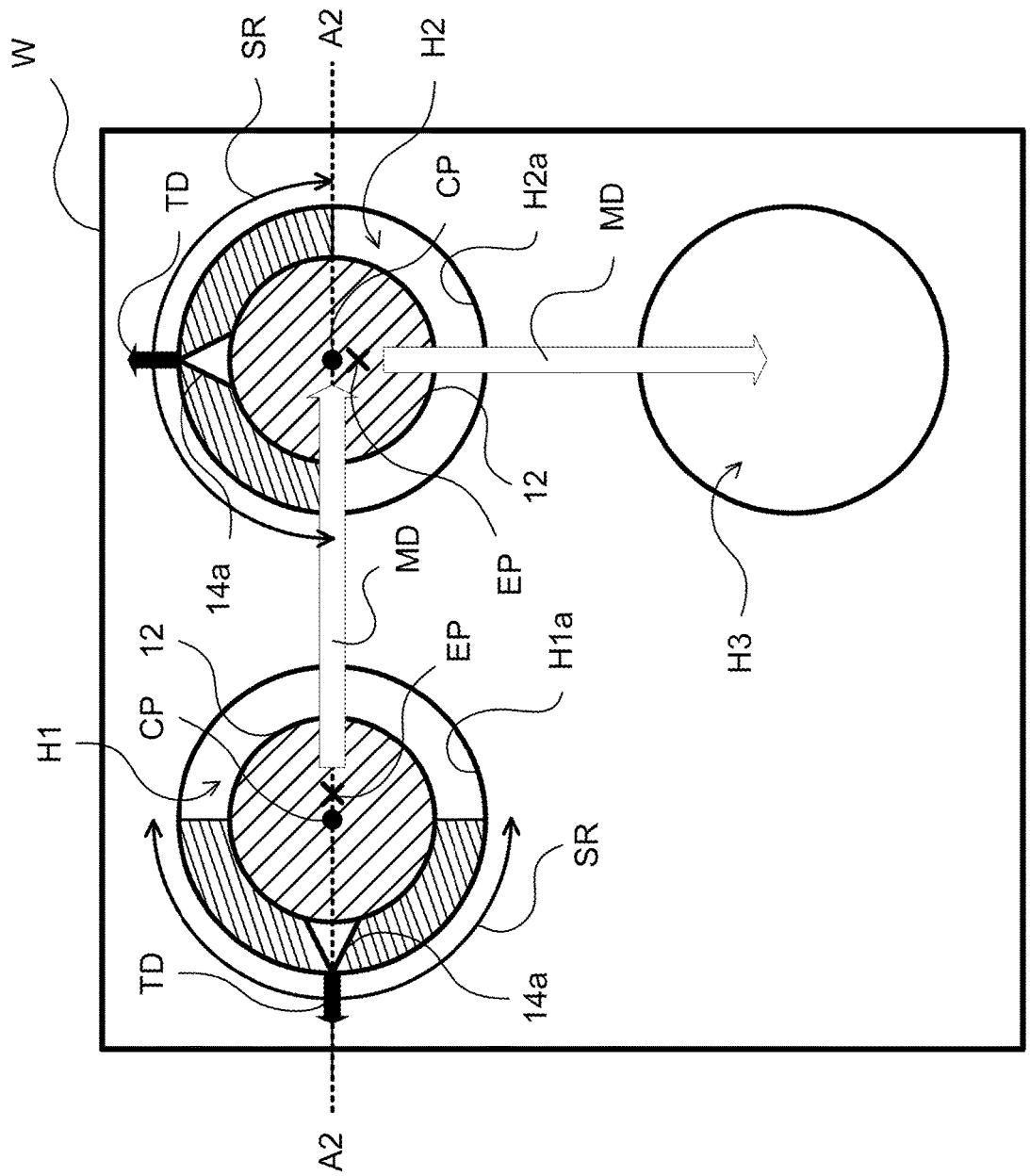

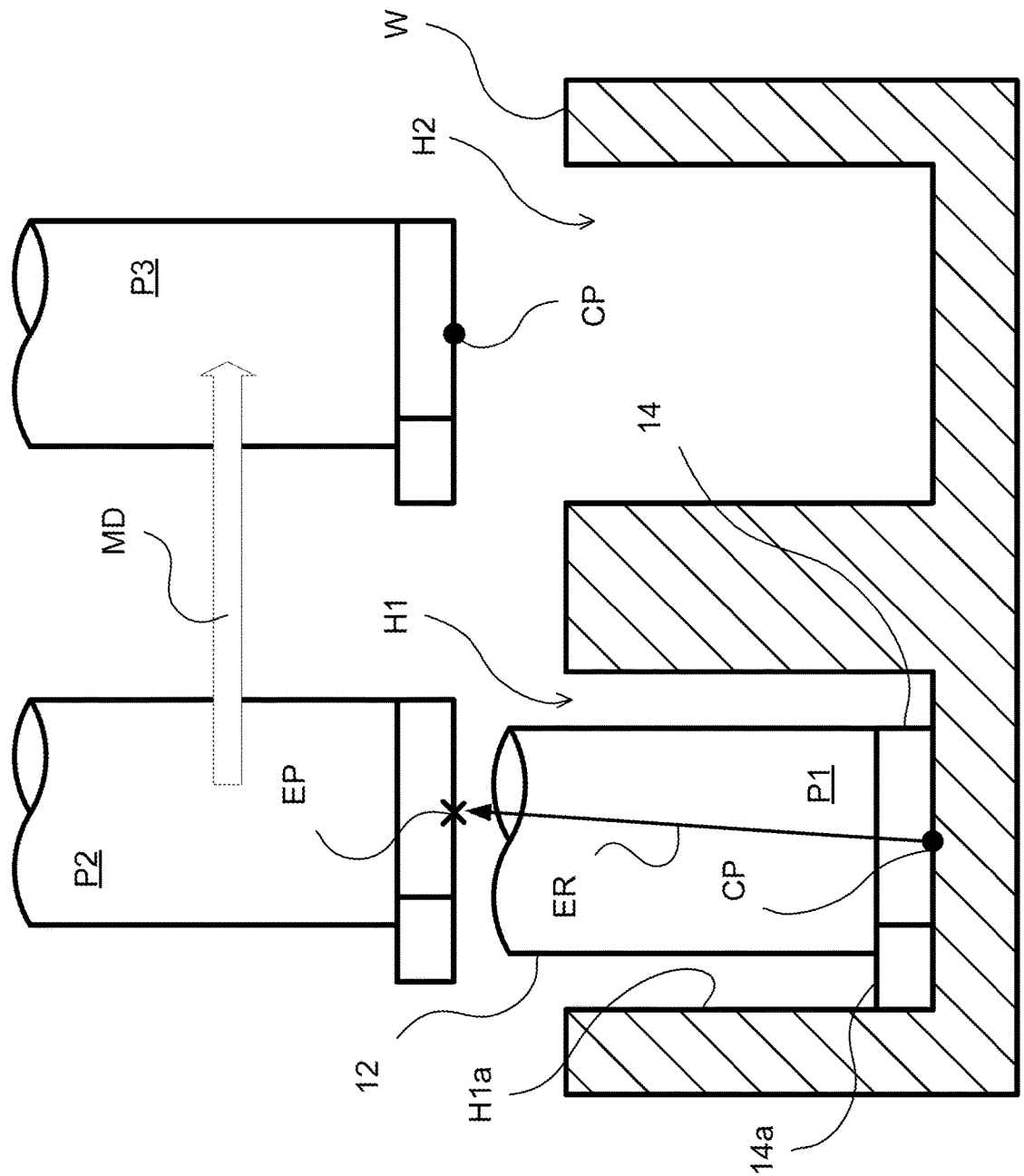

NUMERICAL CONTROL DEVICE AND NUMERICAL CONTROL METHOD FOR CONTROLLING MOVEMENT OF PROCESSING TOOL THAT APPLIES INTERNAL SURFACE PROCESSING TO RECESSED PART FORMED IN ADVANCE IN WORKPIECE

CROSS REFERENCE TO RELATED APPLICATIONS

This is the U.S. National Phase application of PCT/JP2021/017417, filed May 6, 2021, which claims priority to Japanese Patent Application No. 2020-082749, filed May 8, 2020, the disclosures of these applications being incorporated herein by reference in their entireties for all purposes.

FIELD OF THE INVENTION

The present invention is related to a numerical control device and a numerical control method for controlling movement of a processing tool that applies internal surface processing to a recessed part formed in advance in a workpiece.

BACKGROUND OF THE INVENTION

In machinery processing of workpieces, internal surface processing may be applied, in some situations, in order to process the internal surface of a recessed part (e.g., a prepared hole for hole processing or groove processing) formed in advance in a workpiece so as to have a prescribed shape. To apply such internal surface processing, methods such as boring processing (processing to bore) are known.

When control is exercised so as to move a tool that has completed applying the internal surface processing to the recessed part toward a next command point, a controlling device of a processing device causes the processing tool to once retreat from the recessed part on which the internal surface processing has been completed and subsequently exercises control over a relative movement made between the processing tool and the workpiece along a path toward the abovementioned command point. Examples of this type of processing include the situation where a relative movement between a processing tool and a workpiece is controlled along a continuous processing path connecting together recessed parts formed in a plurality of locations in the workpiece. In that situation, it is a common practice that command points in a processing program to move from a recessed part having been processed, to another recessed part to be processed next are provided in the form of a straight line that connects together the centers or the centers of gravity of the two recessed parts.

As an example of such internal surface processing, Patent Literature 1 discloses a processing device and a processing method with a constant depth including: a tool head holding a rotating tool that cuts a workpiece; a table that supports the workpiece; feed means for feeding the tool head in a cutting direction; means for setting a target depth of cutting from a reference plane of the workpiece; means for setting a temporary cutting position for feeding the tool head to a position just before the target depth of cutting is reached; measuring means that includes a pair of sensors and is for touching and detecting the positions of the reference plane of the workpiece and a cut surface temporarily cut by the rotating tool and for measuring a depth of cutting from the reference plane of the workpiece on the basis of the difference between the two positions; calculating means for calculating a remaining depth of cutting by subtracting the depth of the temporary cutting measured by the measuring means from the target depth of cutting; and controlling means for controlling the feed means so as to carry out the temporary cutting in which the tool head is fed to the temporary cutting position and to subsequently carry out final cutting in which the tool head is fed to a final cutting position obtained by adding the calculated remaining depth of cutting to the position of the cut surface that was cut in the temporary cutting. It is indicated that this configuration makes it possible to cut the workpiece with a high level of precision without hardly any error in the depth of cutting from the reference plane.

Further, Patent Literature 2 discloses a workpiece processing method for applying boring processing to a hole formed in a workpiece and a processing device that performs the processing, the workpiece processing method characterized in including: a first step of applying rough processing to the internal circumferential surface of a hole by using a burnishing tool; a second step of applying cutting processing to the roughly-processed internal circumferential surface of the hole by using a cutting tool; and a third step of applying finish processing to the post-cutting internal circumferential surface of the hole by using a burnishing tool. In this configuration, to the internal circumferential surface of the hole in the workpiece, when the cutting processing is applied at the second step, and the burnishing processing is subsequently applied at the third step, the burnishing processing is performed while the hole is prevented from being deformed by cut resistance. It is indicated that this method therefore makes it possible to form a smooth surface.

Patent Literature

[Patent Literature 1] Japanese Patent Laid-Open No. H8-174320
[Patent Literature 2] Japanese Patent Laid-Open No. 2018-51738

SUMMARY OF THE INVENTION

In relation to the above, when internal surface processing is applied to a recessed part formed in a workpiece by using an ordinary numerical control device, a processing device that performs the internal surface processing is set with a processing point of origin and reference axes (e.g., three axes of XYZ) with regard to holding the workpiece and moving a processing tool. Relative movements between the workpiece and the processing tool are made on the basis of the processing point of origin and the reference axes. In that situation, in order to simplify writing of processing commands in a processing program for the internal surface processing, a stop position or a stop orientation of the processing tool upon completion of the internal surface processing on a recessed part (a prepared hole) may be set so as to be always in the same direction (e.g., always in the X-direction or always in a direction that makes the processing tool oriented toward a program point of origin).

However, at the time of causing the processing tool to retreat from the recessed part and to move in a prescribed moving direction upon completion of the internal surface processing, when the stop position or the stop orientation of the processing tool is arranged to be always in the same direction, a situation may arise where the processing tool needs to be moved in a direction that does not include the same vector component as the moving path toward the next command point, during an "escape operation" in which the processing tool retreats from the post-processing recessed part. For this reason, controlling internal surface processing applied to a recessed part presents a problem where, because the moving path taken by the processing tool after the processing is made longer, the moving path of the processing tool in the entire processing program is, as a result, prolonged.

Because of the circumstances described above, there is a demand for a numerical control device and a numerical control method that make it possible, at the time of applying internal surface processing to a recessed part formed in advance in a workpiece, to prevent the moving path to be taken by the processing tool upon completion of the internal surface processing from being prolonged.

A numerical control device that controls movement of a processing tool which applies internal surface processing to a recessed part formed in advance in a workpiece according to an aspect of the present invention includes: a main control unit that gives a processing command to a processing device on a basis of a processing program; a processing program reading unit that pre-reads the processing program; and a tool moving path setting unit that sets a moving path to be taken by the processing tool upon completion of the internal surface processing. The tool moving path setting unit includes: a tool retreat position setting unit that sets a retreat position with respect to the recessed part to be assumed by the processing tool upon completion of the internal surface processing, on a basis of the pre-read processing program; a cutting edge stop angle setting unit that sets a stop angle to be formed upon completion of the internal surface processing by a cutting edge attached to the processing tool, on a basis of a moving direction in which the processing tool is to move from the retreat position; and a tool retreat path setting unit that sets a retreat path from the stop position to the retreat position to be taken by the processing tool upon completion of the internal surface processing. The stop angle is set in such a manner that a pointing direction of a tip of the cutting edge falls within a stop range defined so as not to have a moving vector component oriented in a same direction as the moving direction of the processing tool.

Further, a numerical control method for controlling movement of a processing tool which applies internal surface processing to a recessed part formed in advance in a workpiece according to an aspect of the present invention includes: a tool moving path setting operation to pre-read a processing program and to set a moving path to be taken by the processing tool upon completion of the internal surface processing. The tool moving path setting operation further includes: a step of setting a retreat position with respect to the recessed part to be assumed by the processing tool upon completion of the internal surface processing, on a basis of the pre-read processing program; a step of setting a stop angle to be formed upon completion of the internal surface processing by a cutting edge attached to the processing tool, on a basis of a moving direction in which the processing tool is to move from the retreat position; and a step of setting a retreat path from the stop position to the retreat position to be taken by the processing tool upon completion of the internal surface processing. The stop angle is set in such a manner that a pointing direction of a tip of the cutting edge falls within a stop range defined so as not to have a moving vector component oriented in a same direction as the moving direction of the processing tool.

According to at least one aspect of the present invention described above, the following are performed: the operation to set the retreat position with respect to the recessed part to be assumed by the processing tool upon completion of the internal surface processing, on the basis of the pre-read processing program; the operation to set the stop angle to be formed upon completion of the internal surface processing by the cutting edge attached to the processing tool, on the basis of the moving direction in which the processing tool is to move from the retreat position; and the operation to set the retreat path from the stop position to the retreat position to be taken by the processing tool upon completion of the internal surface processing. In that situation, the stop angle is set in such a manner that the pointing direction of the tip of the cutting edge falls within the stop range defined so as not to have a moving vector component oriented in the same direction as the moving direction of the processing tool. Consequently, at the time of applying the internal surface processing to the recessed part formed in advance in the workpiece, it is possible to prevent the moving path to be taken by the processing tool upon completion of the internal surface processing from being prolonged.

BRIEF DESCRIPTION OF DRAWINGS

FIG. 5A is a drawing showing an outline of a relative movement between the workpiece and the processing tool according to a numerical control method for controlling movement of the processing tool which applies the internal surface processing to the recessed part formed in advance in the workpiece according to a second embodiment.

FIG. 5B is another drawing showing the outline of the relative movement between the workpiece and the processing tool according to the numerical control method for controlling the movement of the processing tool which applies the internal surface processing to the recessed part formed in advance in the workpiece according to the second embodiment.

DETAILED DESCRIPTION OF EMBODIMENTS OF THE INVENTION

The following will describe representative examples of the present invention, by presenting embodiments of a numerical control device and a numerical control method for controlling movement of a processing tool that applies internal surface processing to a plurality of recessed parts, together with drawings.

First Embodiment

Figure 1:
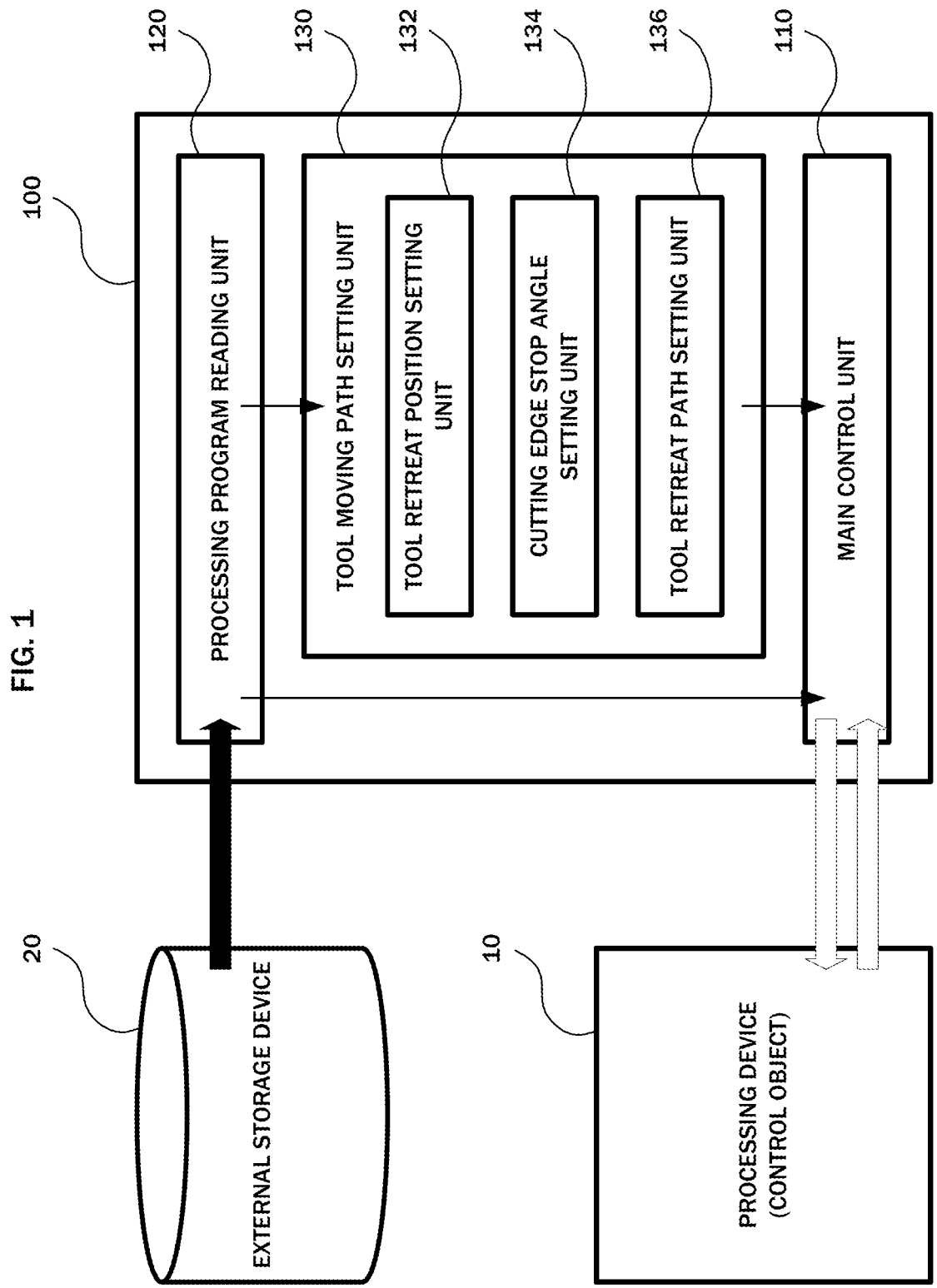
FIG. 1 is a block diagram showing relationships between a numerical control device that controls movement of a processing tool which applies internal surface processing to a recessed part formed in advance in a workpiece and peripheral devices thereof according to a first embodiment of the present invention.
Figure 2:
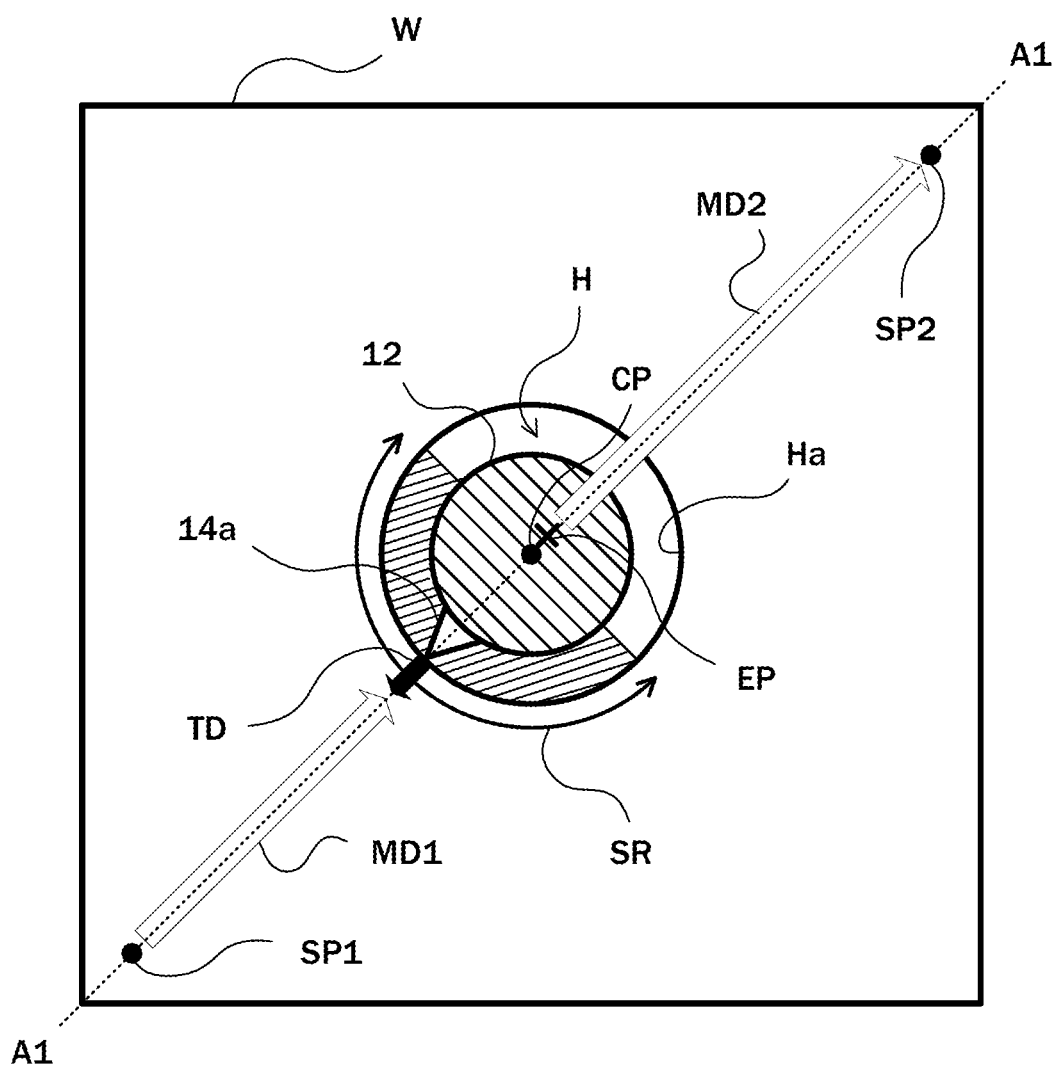
FIG. 2 is a drawing showing an outline of a relative movement between the workpiece and the processing tool according to a numerical control method for controlling the movement of the processing tool which applies the internal surface processing to the recessed part formed in advance in the workpiece according to the first embodiment.
Figure 3A:
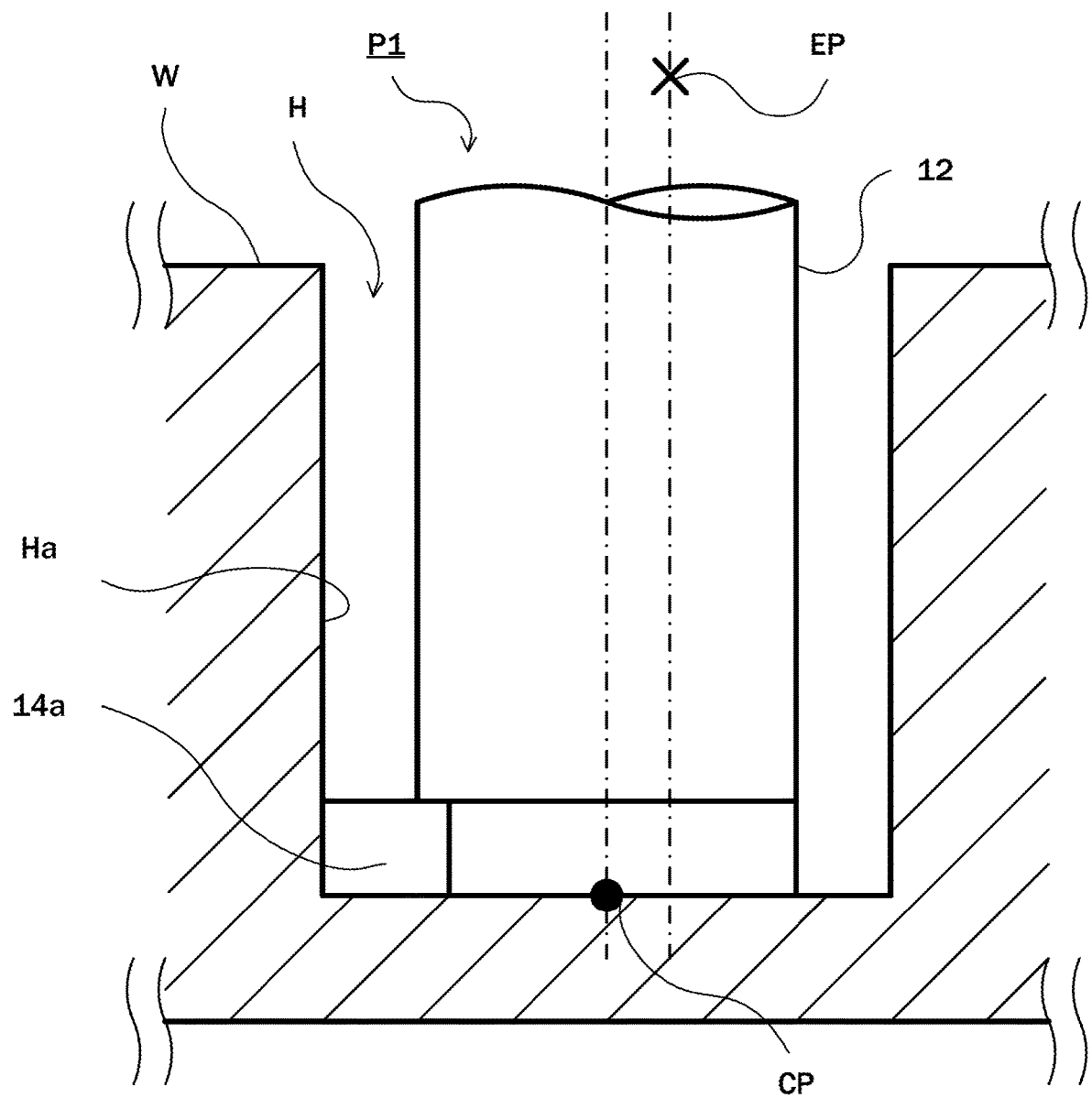
FIG. 3A is a partial cross-sectional view taken at line A1-A1 in FIG. 2.
Figure 3B:
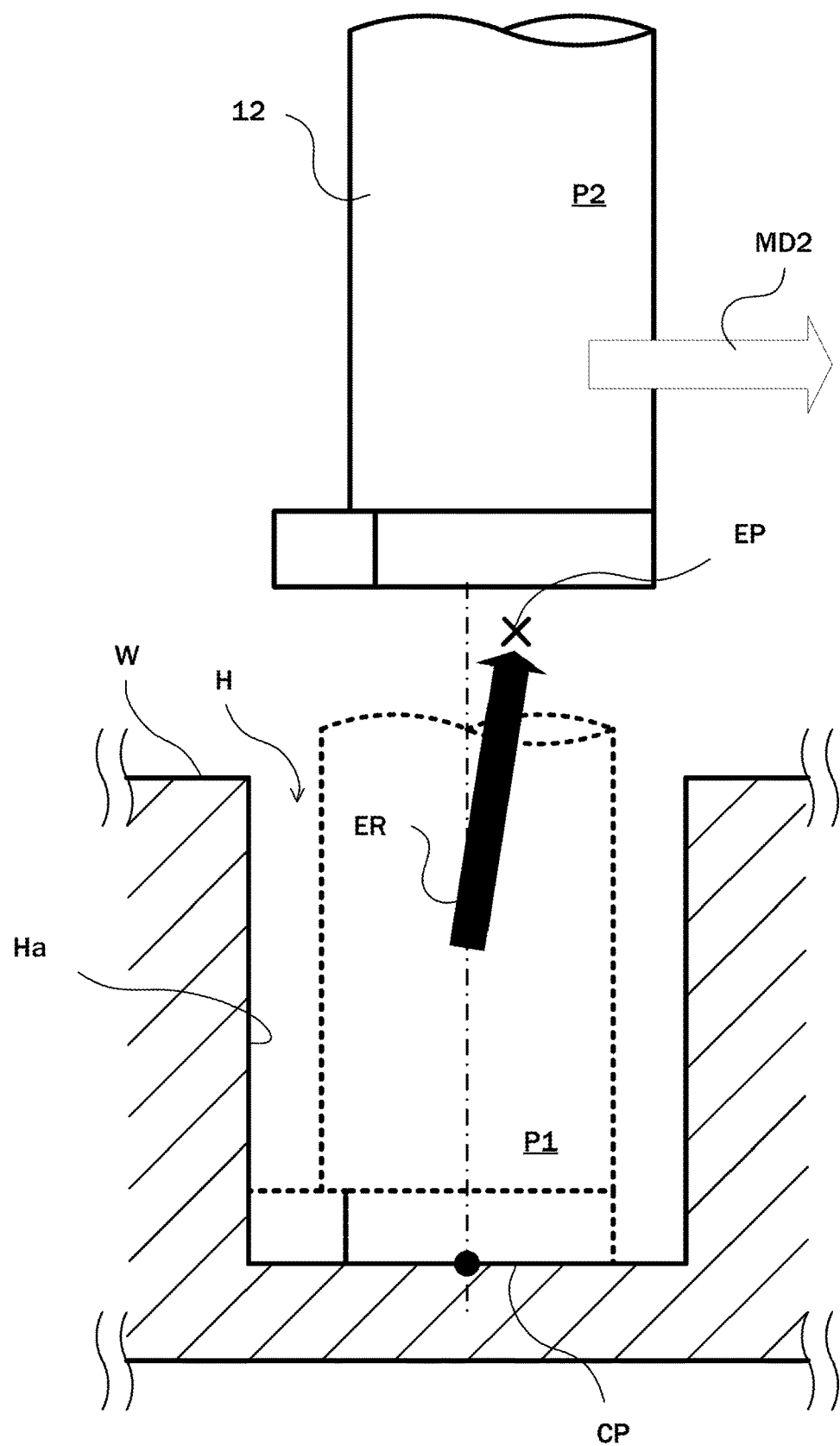
FIG. 3B is another partial cross-sectional view taken at line A1-A1 in FIG. 2.

FIG. 1 is a block diagram showing relationships between a numerical control device that controls movement of a processing tool which applies internal surface processing to a recessed part formed in advance in a workpiece and peripheral devices thereof according to a first embodiment, which presents a representative example of the present invention. In addition, FIG. 2 is a drawing showing an outline of a relative movement between the workpiece and the processing tool according to a numerical control method for controlling the movement of the processing tool which applies the internal surface processing to the recessed part formed in advance in the workpiece according to the first embodiment. Further, FIG. 3A and FIG. 3B are partial cross-sectional views taken at line A1-A1 in FIG. 2.

In this regard, the "internal surface processing" in the present specification includes a technique for further cutting or applying finish processing to the internal surface of a hole or a groove (which will simply be referred to as a "prepared hole") processed in advance in a workpiece W. Examples of the internal surface processing include a processing technique for boring processing or the like by which a cutting edge circumferentially projecting from a rotating processing tool in a top view comes in contact with the internal surface of the recessed part while the center of a main rotation axis remains unmoved. Further, in the present specification, it is assumed that a processing program for applying the internal surface processing to the recessed part includes an operation of the processing tool to position itself at (to return to) a processing point of origin of a processing device 10 or a prescribed designated point (e.g., a start point SP1 and an end point SP2 shown in FIG. 2), before and after a series of processing operations.

As shown in FIG. 1, a numerical control device 100 in an example thereof includes: a main control unit 110 that gives a processing command to the processing device (a control object) 10 on the basis of the processing program stored in an external storage device 20; a processing program reading unit 120 that pre-reads the processing program from the external storage device 20; and a tool moving path setting unit 130 that sets moving paths to be taken by a processing tool 14 before and after applying the processing to a recessed part H1 formed in the workpiece W. The numerical control device 100 is connected to the processing device 10 and to the external storage device 20 in a wired manner or via a communication line or the like, so as to be able to communicate with each other. The numerical control device 100 is configured to be able to give various types of control commands to the processing device 10 and to receive detection signals from various types of sensors (not shown) attached to the processing device 10. Further, the numerical control device 100 may be connected to or may include various types of other attachment devices such as an input device and/or a display device (not shown).

In this situation, as long as the processing device 10 is capable of performing the abovementioned internal surface processing, the configuration thereof is not limited. In an example, the processing device 10 may be configured so as to include a processing table that holds the workpiece W and a rotating mechanism such as a spindle that holds and rotates a rotating member 12. Further, the processing device 10 performs a tool moving operation including the processing operation of the internal surface processing and the processing tool retreat operation, by exercising numerical control over the positions of the processing table and/or the rotating mechanism, on the basis of control command signals from the numerical control device 100.

Further, as shown in FIG. 2, the processing tool 14 is attached in such a manner that a cutting edge 14a radially projects in a lower end part of the rotating member 12 that has a substantially circular columnar shape or substantially circular cylindrical shape. As the rotating member 12 rotates, the processing tool 14 rotates around the outer circumference of the rotating member 12. Further, the rotating member 12 is attached to the rotating mechanism (not shown) such as the spindle of the processing device 10 so as to be able to make three-dimensional relative movements with respect to the workpiece W. As a result, the cutting edge 14a of the rotating processing tool 14 comes into contact with an internal surface Ha of the recessed part H formed in the workpiece W, so as to perform the internal surface processing.

The main control unit 110 is means for issuing operation command signals for the controlled element 10 and, in an example, includes a function of generating the control command signals given to the processing device 10 by combining a block of the processing program read by the processing program reading unit 120 (explained later) with a moving command for the processing tool 14 generated by the tool moving path setting unit 130 and includes a function of receiving the detection signals from the various types of sensors (not shown) provided for the processing device 10 and correcting the control command signals in accordance with detected values thereof. Further, the main control unit 110 may include a function of adding or correcting a control program saved in the external storage device 20 as necessary.

In an example, the processing program reading unit 120 includes a function of successively pre-reading and analyzing blocks of the processing program from the external storage device 20 and determining what type of control commands are included in the pre-read blocks of the processing program; and a function of temporarily storing or saving therein the pre-read blocks of the processing program. Further, when the pre-read blocks of the processing program include no processing end command, the processing program reading unit 120 sends the blocks to the main control unit 110. When any of the pre-read blocks includes a processing end command, the processing program reading unit 120 sends the blocks read thereafter to the main control unit 110, and in parallel, to the tool moving path setting unit 130.

The tool moving path setting unit 130 includes: a tool retreat position setting unit 132 that sets, on the basis of the blocks of the processing program received from the processing program reading unit 120, a retreat position P2 (see FIG. 3B) with respect to the recessed part H to be assumed by the processing tool 14 upon completion of the internal surface processing; a cutting edge stop angle setting unit 134 that sets a stop angle to be formed upon completion of the internal surface processing by the cutting edge 14a attached to the processing tool 14, on the basis of a moving direction MD2 in which the processing tool 14 is to subsequently move from the retreat position P2; and a tool retreat path setting unit 136 that sets a retreat path ER from a stop position P1 to the retreat position P2 to be taken by the processing tool 14 upon completion of the internal surface processing. Further, when it is determined that any of the blocks of the processing program pre-read by the processing program reading unit 120 is a processing end command, the tool moving path setting unit 130 has a function of receiving a group of blocks after the processing end command and thereafter and temporarily storing therein the group of blocks. In this situation, as shown in FIG. 2, in an example, the moving direction MD2 denotes a direction in which the processing tool 14 moves, during the operation which is included in the processing program as described above and is performed by the processing tool 14 to position itself at (to return to) the program point of origin of the processing tool in the processing device 10 or a prescribed designated point (see the reference sign SP2 in FIG. 2), before and after the processing operation.

The tool retreat position setting unit 132 analyzes control commands included in the group of blocks of the processing program temporarily stored as explained above, and identifies a movement start position (the retreat position P2) to be used when the processing tool 14 moves, after the processing, from the currently processed recessed part H to the designated point SP2 so as to further set a representative point. In this situation, as shown in FIG. 2, the representative point of the retreat position P2 may be, in an example, a retreat point EP at which a rotation center CP is positioned in a lower end part of the rotating member 12 to which the processing tool 14 is attached, for instance.

The cutting edge stop angle setting unit 134 has a function of setting an angle (a stop angle) to be formed, when stopping, by the cutting edge 14a attached to the tip of the processing tool 14, for example, when the "escape operation" is performed by the processing tool 14 by stopping the rotation of the rotating member 12 in a currently processed recessed part H1 according to the processing end command included in the processing program. In this situation, in an example, the "stop angle" of the cutting edge 14a may be defined as an absolute angle within the range of 0° to 360° with respect to a reference axis, which is a prescribed axial direction (e.g., the X-direction of the table holding the workpiece W) on a plane orthogonal to the rotation axis (the axis going through the rotation center CP in FIG. 2) of the rotating member 12.

In the present invention, the stop angle of the cutting edge 14a defined as described above is set in such a manner that a pointing direction TD of the tip of the cutting edge 14a falls within a stop range SR defined so as not to have a moving vector component oriented in the same direction as the abovementioned moving direction MD2 from the recessed part H. In an example, the stop range SR is set, in the specific example shown in FIG. 2, so as to fall within a range of 180° with respect to the moving direction MD that is positioned orthogonal to the circumferential direction of the rotating member 12. As a result, as shown in FIG. 3B, when the cutting edge 14a of the processing tool 14 attached to the rotating member 12 moves away from the internal surface Ha of the recessed part H upon completion of the internal surface processing, the retreat operation is always made in a direction having the same vector component as the moving direction MD2 (i.e., a direction that does not go against the moving direction MD2). Thus, the moving path of the processing tool 14 is prevented from being prolonged.

Further, as shown in FIG. 2, it is desirable to set the abovementioned stop angle to be such an angle that the pointing direction TD of the tip of the cutting edge 14a is the opposite direction of the moving direction MD2 on mutually the same straight line. With this arrangement, it is possible to easily set the stop angle of the cutting edge 14a by using the moving direction MD2 as a reference. Thus, no additional calculation is required, while it is also possible to reduce burdens on program creators.

As shown in FIG. 3B, the tool retreat path setting unit 136 has a function of creating and setting the retreat path ER used, for example, for causing the rotating member 12 and the processing tool 14 to retreat toward the retreat position P2 set by the tool retreat position setting unit 132, from the stop position P1 assumed by the processing tool 14 upon completion of the internal surface processing on the recessed part H. For instance, in the specific example shown in FIG. 3B, the retreat path ER is set as a line linearly connecting the rotation center CP corresponding to the stop position P1 with the retreat point EP corresponding to the retreat position P2.

After these processes, the tool moving path setting unit 130 determines the moving path from the recessed part H to the designated point (the end point) SP2 including the retreat operation using the retreat path ER set by the tool retreat path setting unit 136, as a tool moving path setting operation and further sends operation information thereof to the main control unit 110. After that, upon receipt of the operation information, the main control unit 110 creates a moving command for the processing tool 14 corresponding to the moving path and transmits the moving command to the processing device 10, so as to exercise control over the processing device 10.

Figure 4:
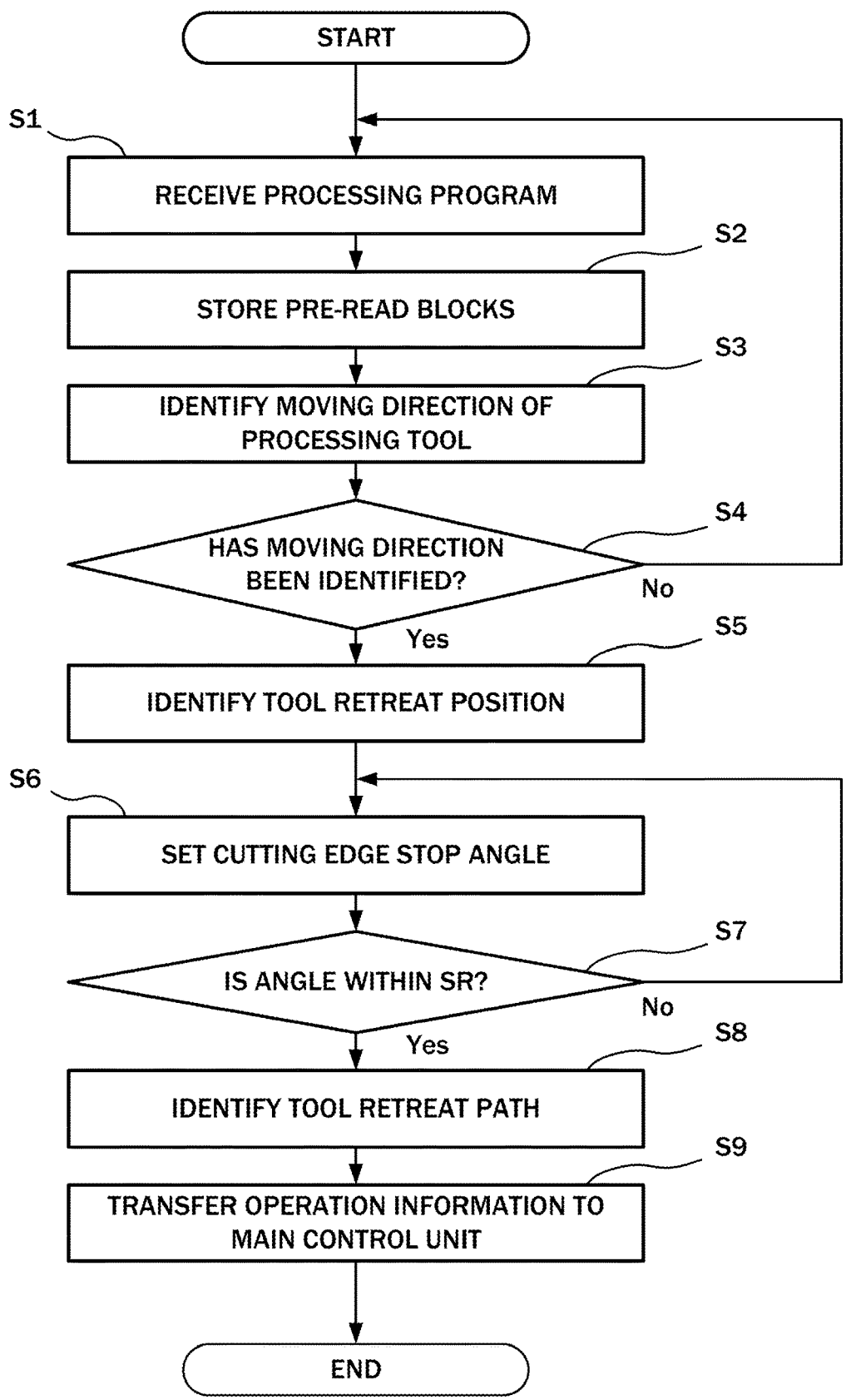
FIG. 4 is a flowchart showing an example of a flow performed by the numerical control device to identify a tool stop angle and a tool retreat path to be used in a retreat operation of the processing tool from the recessed part according to the first embodiment.

FIG. 4 is a flowchart showing an example of a flow performed by the numerical control device to identify the tool stop angle and the tool retreat path to be used in the retreat operation of the processing tool from the recessed part according to the first embodiment. The flowchart shown in FIG. 4 may be implemented in parallel to the processing command operation of the main control unit 110. In an example, under the processing control command executed by the main control unit 110 on the processing device 10, when the processing program reading unit 120 determines a block corresponding to the processing end command, this flowchart may be implemented in parallel to the internal surface processing command to be applied to the recessed part.

As shown in FIG. 4, in the operation to identify the tool retreat path of the processing tool 14 in the first embodiment, the tool moving path setting unit 130 receives the blocks of the processing program pre-read by the processing program reading unit 120 (step S1) and temporarily stores the blocks therein (step S2). Subsequently, the tool retreat position setting unit 132 identifies the moving direction MD2 from the recessed part on which internal surface processing is currently applied, to the designated point SP2 to which the processing tool 14 is to move next, on the basis of the group of blocks of the processing program that are stored at present (step S3).

In this situation, the tool retreat position setting unit 132 determines whether or not the moving direction MD2 has been identified (step S4). When it is determined in step S4 that the moving direction MD2 has been identified, a tool retreat position P2 (or a retreat point EP) is identified with respect to the currently processed recessed part, on the basis of the identified moving direction MD2 (step S5).

In this situation, for instance, the retreat point EP is, in an example, selected from among certain positions that share mutually the same rotation center CP when the shape of the processing tool 14 is projected onto the currently processed recessed part (e.g., the recessed part H), on mutually the same straight line for the moving direction toward the designated point. On the contrary, when it is not determined in step S4 that the moving direction MD2 has been identified, the process returns to step S1 so as to perform again the process of pre-reading and storing the blocks from the processing program.

Subsequently, the cutting edge stop angle setting unit 134 sets the cutting edge stop angle of the cutting edge 14a of the processing tool 14 to be formed upon completion of the processing on the recessed part currently undergoing the internal surface processing (step S6). In this situation, the cutting edge stop angle may be specified in the processing program in advance similarly to conventional examples or may be calculated by using a calculation formula based on various types of processing conditions.

After that, the cutting edge stop angle setting unit 134 determines whether or not the cutting edge stop angle set in step S6 falls within the abovementioned prescribed stop range (the reference sign SR in FIG. 2) (step S7). In step S7, when it is determined that the set cutting edge stop angle falls within the stop range SR, the cutting edge stop angle is confirmed to be appropriate, and the process proceeds to the subsequent steps.

On the contrary, when it is determined in step S7 that the set cutting edge stop angle falls outside the stop range SR, the cutting edge stop angle is determined to be inappropriate, and the process returns to step S6 so as to re-set the cutting edge stop angle. As a result of the series of operations described above, it is possible to ensure, as one of the characteristics of the present invention, that the cutting edge stop angle to be formed upon completion of the internal surface processing is set within the prescribed stop range.

Subsequently, the tool retreat path setting unit 136 identifies the retreat path ER from the stop position P1 to the retreat position P2 to be taken by the processing tool 14 shown in FIG. 3B (step S8), so that the tool moving path setting unit 130 sends, to the main control unit 110, the operation information about the tool moving path setting operation including the retreat operation using the retreat path ER identified in step S8 (step S9), and the routine is thus ended. After that, the main control unit 110 performs a tool moving operation on the basis of the operation information about the tool moving path setting operation.

As a result of the configurations and the operations described above, the numerical control device and the numerical control method according to the first embodiment of the present invention perform the following: the operation of setting the retreat position with respect to the recessed part to be assumed by the processing tool upon completion of the internal surface processing, on the basis of the pre-read processing program; the operation of setting the stop angle to be formed upon completion of the internal surface processing by the cutting edge attached to the processing tool, on the basis of the moving direction in which the processing tool is to move from the retreat position; and the operation of setting the retreat path from the stop position to the retreat position to be taken by the processing tool upon completion of the internal surface processing. In that situation, the stop angle is set in such a manner that the pointing direction of the tip end of the cutting edge falls within the stop range defined so as not to have the moving vector component oriented in the same direction as the moving direction of the processing tool. Consequently, at the time of applying the internal surface processing to the recessed part formed in advance in the workpiece, it is possible to prevent the moving path to be taken by the processing tool upon completion of the internal surface processing from being prolonged.

Second Embodiment

FIG. 5A and FIG. 5B are drawings showing an outline of a relative movement between the workpiece and the processing tool according to a numerical control method for controlling movement of the processing tool which applies the internal surface processing to recessed parts formed in advance in the workpiece according to a second embodiment, which presents another example of the present invention. In the second embodiment, some of the elements that are the same or can adopt the same configurations as those in the first embodiment in the block diagram of FIG. 1, the flowchart of FIG. 4, and the like will be referred to by using the same reference signs, and duplicate explanations thereof will be omitted.

In the second embodiment, an example will be explained in which movement of the processing tool is controlled in the situation where internal surface processing is consecutively applied to a plurality of recessed parts formed in advance in the workpiece. The "plurality of recessed parts" may include both the situation where a plurality of prepared holes are formed in the single workpiece W and the situation where a plurality of workpieces W in each of which the recessed part H1 is formed are arranged with the processing device.

In the second embodiment, as shown in the partial cross-sectional view taken at line A2-A2 in FIG. 5B, the tool moving path setting unit 130 sets a moving path from the stop position P1 to a processing start position P3 of another recessed part H2 to be processed next, to be taken by the processing tool 14 upon completion of the internal surface processing applied to the one recessed part H1. In this situation, the "moving direction in which the processing tool is to subsequently move" described in the first embodiment is, for example, determined as the direction (the reference sign MD in FIG. 5A and FIG. 5B) of the line connecting the retreat point in the one of the recessed parts on which the internal surface processing has been completed, to the processing start point in the other recessed part to be processed next.

The tool retreat position setting unit 132 analyzes the control commands included in the group of blocks of the processing program temporarily stored as described above, so as to identify the movement start position (the retreat position P2) to be used when the processing tool 14 is moved from the recessed part H1 that has just been processed to the recessed part H2 to be processed next, so as to further set a representative point thereof. In this situation, as shown in FIG. 5B, the representative point of the retreat position P2, in an example, is the retreat point EP at which the rotation center CP is positioned in a lower end part of the rotating member 12 to which the processing tool 14 is attached.

According to the processing end command included in the processing program, the cutting edge stop angle setting unit 134 sets, similarly to the first embodiment, an angle (a stop angle) to be formed, when stopping, by the cutting edge 14a attached to the tip of the processing tool 14. In this situation, in the second embodiment, the stop angle of the cutting edge 14a is set in such a manner that the pointing direction TD of the tip of the cutting edge 14a falls within the stop range SR defined so as not to have a moving vector component oriented in the same axial direction as the moving direction MD from the recessed part H1 to the recessed part H2 to be processed next.

As a result, as shown in FIG. 5B, when the cutting edge 14a of the processing tool 14 attached to the rotating member 12 moves away from the internal surface H1a of the recessed part H1 upon completion of the internal surface processing, the retreat operation is always made in a direction having the same vector component as the moving direction MD (i.e., a direction that does not go against the moving direction MD2). Thus, the moving path of the processing tool 14 is prevented from being prolonged. In addition, similarly to the first embodiment, it is desirable to set the abovementioned stop angle to be such an angle that the pointing direction TD of the tip of the cutting edge 14a is the opposite direction of the moving direction MD on mutually the same straight line.

As shown in FIG. 5B, the tool retreat path setting unit 136 has a function of creating and setting the retreat path ER used for causing the rotating member 12 and the processing tool 14 to retreat toward the retreat position P2 set by the tool retreat position setting unit 132, from the stop position P1 assumed by the processing tool 14 upon completion of the internal surface processing on the recessed part H1, for example. For instance, in the specific example shown in FIG. 5B, the retreat path ER is set as a line linearly connecting the rotation center CP corresponding to the stop position P1 with the retreat point EP corresponding to the retreat position P2.

After these processes, the tool moving path setting unit 130 determines, similarly to the first embodiment, the moving path from the recessed part H1 to the recessed part H2 including the retreat operation using the retreat path ER set by the tool retreat path setting unit 136, as a tool moving path setting operation between the recessed parts and further sends operation information thereof to the main control unit 110. After that, upon receipt of the operation information, the main control unit 110 creates a moving command for the processing tool 14 corresponding to the tool moving path setting operation and transmits the moving command to the processing device 10, so as to exercise control over the processing device 10.

As a result of these operations, in the second embodiment, it is possible, in addition to the advantageous effects achieved by the numerical control device and the numerical control method according to the first embodiment, to control the series of moving operations of the processing tool in which the internal surface processing is consecutively applied to one after another among the plurality of recessed parts. In this situation, the moving direction MD of the processing tool after performing the internal surface processing on each recessed part (e.g., the recessed part H1) is specified every time as a direction to move toward the recessed part to be processed next (e.g., H2). Consequently, it is possible to control the movement of the processing tool, without stopping the series of processing control exercised by the processing program and without increasing burdens on program creators.

Third Embodiment

Figure 6A:
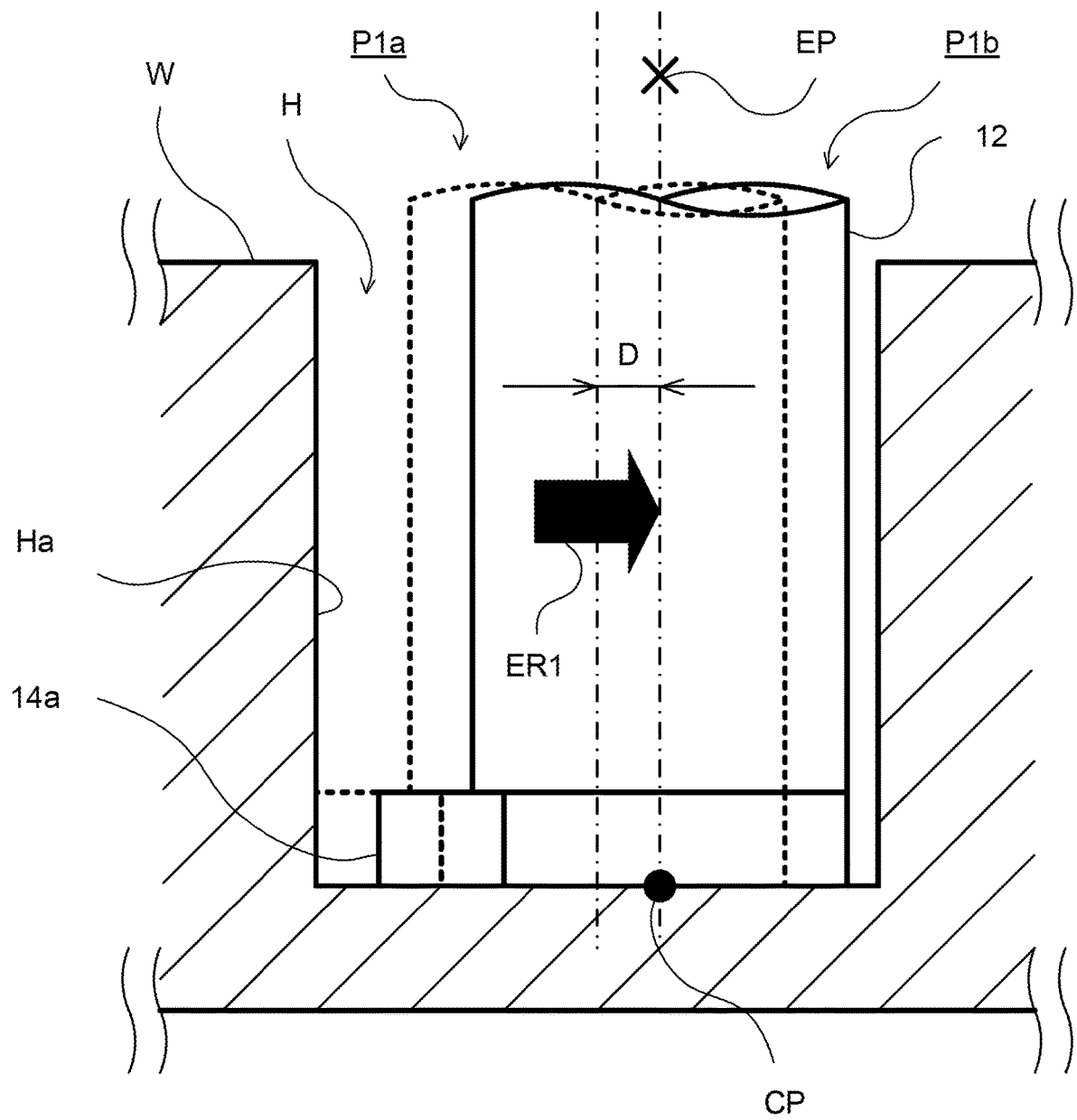
FIG. 6A is a drawing showing an outline of a relative movement between the workpiece and the processing tool according to a numerical control method for controlling movement of the processing tool which applies the internal surface processing to the recessed part formed in advance in the workpiece according to a third embodiment.
Figure 6B:
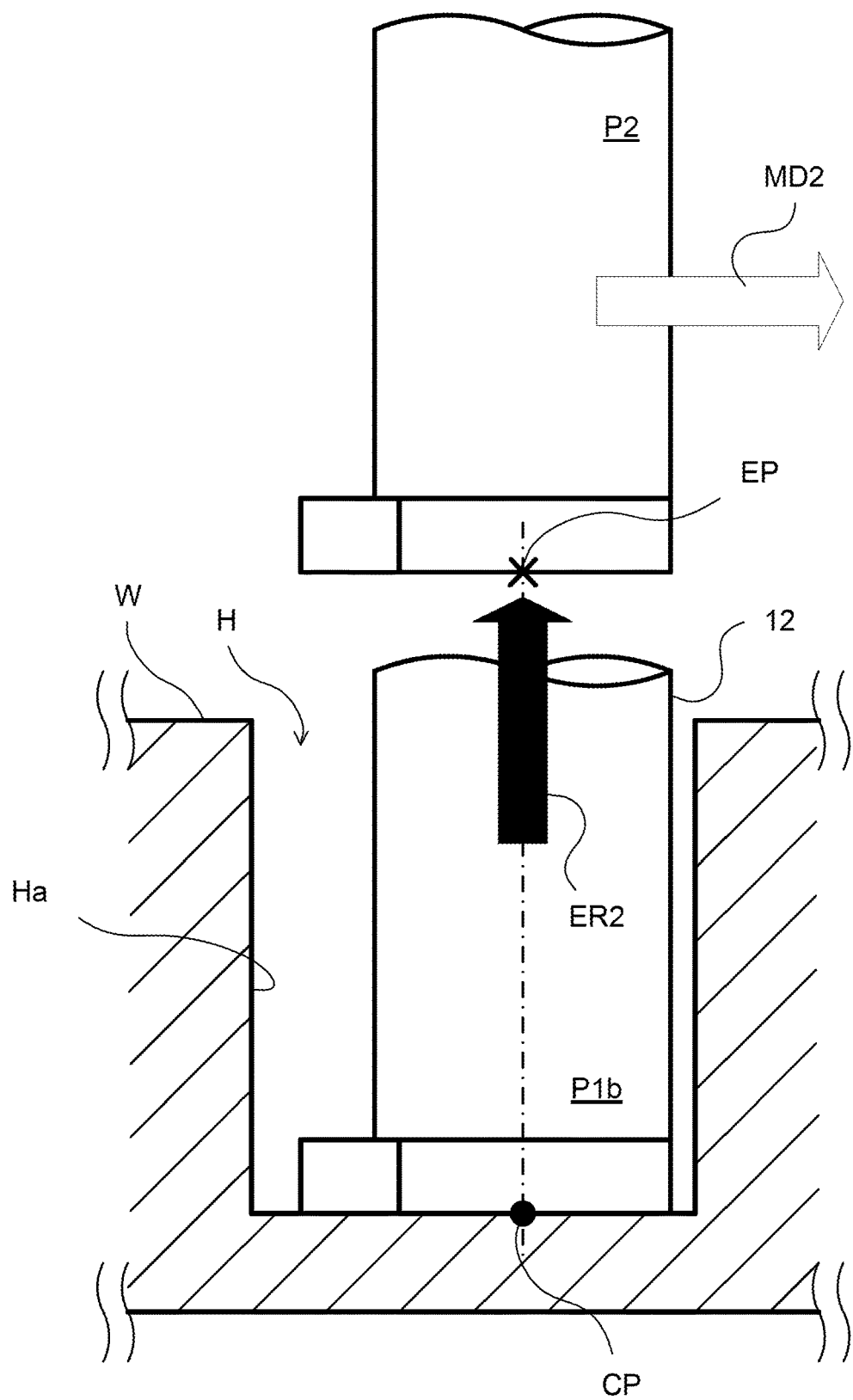
FIG. 6B is another drawing showing the outline of the relative movement between the workpiece and the processing tool according to the numerical control method for controlling the movement of the processing tool which applies the internal surface processing to the recessed part formed in advance in the workpiece according to the third embodiment.

FIG. 6A and FIG. 6B are drawings showing an outline of a relative movement between the workpiece and the processing tool according to a numerical control method for controlling movement of the processing tool which applies the internal surface processing to a recessed part formed in advance in the workpiece according to a third embodiment, which presents yet another example of the present invention. In the third embodiment also, some of the elements that are the same or can adopt the same configurations as those in the first embodiment in the block diagram of FIG. 1, the flowchart of FIG. 4, and the like will be referred to by using the same reference signs, and duplicate explanations thereof will be omitted.

In the third embodiment, the retreat path ER set by the tool retreat path setting unit 136 is made up of: a first retreat path ER1 extending from a stop position P1a assumed upon completion of the internal surface processing, to an isolation position P1b obtained by translating the rotation axis of the rotating member 12 to which the processing tool 14 is attached by a prescribed distance D; and a second retreat path ER2 extending from the isolation position P1b to the retreat position P2. In this situation, when an argument from the currently executed processing program or a past processing program is used, the prescribed distance D may be determined in accordance with the rotation radius of the processing tool 14 or may be determined as a default value set for each controlling device. Further, the translation of the processing tool 14 is implemented in such a direction that the cutting edge 14a is pointed toward rotation center CP.

As a result of these operations, in the third embodiment, it is possible, in addition to the advantageous effects achieved by the numerical control device and the numerical control method according to the first embodiment, to allow the processing tool 14 to escape upon completion of the internal surface processing from the internal surface Ha of the recessed part H, at first, by using the path formed as the first retreat path ER1. It is therefore possible to avoid, without fail, the situation where the post-processing internal surface Ha of the recessed part H is damaged during the escape operation. In addition, as shown in FIG. 6B, because the translation using the first retreat path ER1 is implemented in a direction that includes the same vector component as the moving direction MD2 in which the processing tool is to move subsequently, it is possible to prevent the moving path of the processing tool from being prolonged.

Further, in the specific example shown in FIG. 6A, the moving amount D of the translation using the first retreat path ER1 is shown to be the distance by which the rotation center CP corresponding to the stop position P1a comes to the position directly underneath the retreat point EP corresponding to the retreat position P2. In a modification example of the third embodiment, however, the movement amount D may be a value that can arbitrarily be selected. With this arrangement, because the depth of cutting changes in the depth direction in the internal surface processing applied to the recessed part H, for example, when the internal surface Ha is an uneven surface, it is possible to prevent the processing tool 14 from coming into contact with the internal surface Ha of the recessed part H during the retreat operation, by setting the translation amount D to be larger than projection amounts of the unevenness.

The present invention is not limited to the embodiments described above and may be changed as appropriate without departing from the gist thereof. Within the scope of the invention of the present disclosure, it is possible to modify arbitrary one or more of the constituent elements in the embodiments and to omit arbitrary one or more of the constituent elements in the embodiments.

REFERENCE SIGNS LIST 10 processing device
20 external storage device 100 numerical control device
110 main control unit
120 processing program reading unit
130 tool moving path setting unit
132 tool retreat position setting unit
134 cutting edge stop angle setting unit
136 tool retreat path setting unit

The invention claimed is:

1. A numerical control device that controls movement of a processing tool which applies internal surface processing to a recessed part formed in advance in a workpiece, the numerical control device configured to execute a processing program stored in a memory accessible to the numerical controller, wherein execution of the processing program causes the numerical control device to:
   give a processing command to a connected processing device on a basis of the processing program;
   pre-read and analyze blocks of the processing program to determine a type of control command for the movement of the processing tool; and
   set a moving path to be taken by the processing tool upon completion of the internal surface processing on the workpiece, wherein in the setting of the moving path to be taken by the processing tool, the numerical control device further:
   sets a retreat position with respect to the recessed part to be assumed by the processing tool upon completion of the internal surface processing, on a basis of the pre-read and analyzed blocks of the processing program;
   sets a stop angle to be formed upon completion of the internal surface processing by a cutting edge attached to the processing tool, on a basis of a moving direction in which the processing tool is to move from the retreat position; and
   sets a retreat path from the stop position to the retreat position to be taken by the processing tool upon completion of the internal surface processing,
   wherein the stop angle is set in such a manner that a pointing direction of a tip of the cutting edge falls within a stop range defined so as not to have a moving vector component oriented in a same direction as the moving direction.

2. The numerical control device according to claim 1, wherein
   the stop angle is set to be such an angle that the pointing direction of the tip of the cutting edge is an opposite direction of the moving direction on a mutually same straight line.

3. The numerical control device according to claim 1, wherein
   the retreat path further includes: a first retreat path extending in a direction that translates a rotation axis of the processing tool from the stop position; and a second retreat path extending toward the retreat position.

4. The numerical control device according to claim 3, wherein
   a moving amount of the translation is determined in correspondence with a shape of the recessed part having been processed.

5. The numerical control device according to claim 1, wherein
   the workpiece has a plurality of recessed parts formed therein in advance, and
   the moving direction is set as a direction connecting a retreat point in one of the recessed parts on which the internal surface processing has been completed, to a processing start point in another one of the recessed parts to be processed next.

6. The numerical control device according to claim 1, wherein
   the recessed part is formed in advance in each of a plurality of workpieces, and
   the moving direction is set as a direction connecting a retreat point in one of the recessed parts on which the internal surface processing has been completed, to a processing start point in another one of the recessed parts to be processed next.

7. A numerical control method for controlling movement of a processing tool which applies internal surface processing to a recessed part formed in advance in a workpiece, the numerical control method comprising:
   a tool moving path setting operation to pre-read a processing program and to set a moving path to be taken by the processing tool upon completion of the internal surface processing, wherein
   the tool moving path setting operation further includes:
   a step of setting a retreat position with respect to the recessed part to be assumed by the processing tool upon completion of the internal surface processing, on a basis of the pre-read processing program;
   a step of setting a stop angle to be formed upon completion of the internal surface processing by a cutting edge attached to the processing tool, on a basis of a moving direction in which the processing tool is to move from the retreat position; and
   a step of setting a retreat path from the stop position to the retreat position to be taken by the processing tool upon completion of the internal surface processing, and
   the stop angle is set in such a manner that a pointing direction of a tip of the cutting edge falls within a stop range defined so as not to have a moving vector component oriented in a same direction as the moving direction.

8. The numerical control method according to claim 7, wherein
   the stop angle is set to be such an angle that the pointing direction of the tip of the cutting edge is an opposite direction of the moving direction on a mutually same straight line.

9. The numerical control method according to claim 7, wherein
   the retreat path further includes: a first retreat path extending in a direction that translates a rotation axis of the processing tool from the stop position; and a second retreat path extending toward the retreat position.

10. The numerical control method according to claim 9, wherein
    a moving amount of the translation is determined in correspondence with a shape of the recessed part having been processed.

11. The numerical control method according to claim 7, wherein
    the workpiece has a plurality of recessed parts formed therein in advance, and
    the moving direction is set as a direction connecting a retreat point in one of the recessed parts on which the internal surface processing has been completed, to a processing start point in another one of the recessed parts to be processed next.

12. The numerical control method according to claim 7, wherein the recessed part is formed in advance in each of a plurality of workpieces, and the moving direction is set as a direction connecting a retreat point in one of the recessed parts on which the internal surface processing has been completed, to a processing start point in another one of the recessed parts to be processed next.

* * * * *